May 29, 1956　　　L. TIGERMAN ET AL　　　2,747,346
METHOD OF FORMING PACKAGES
Filed March 13, 1951　　　　　　　　　　　9 Sheets-Sheet 4
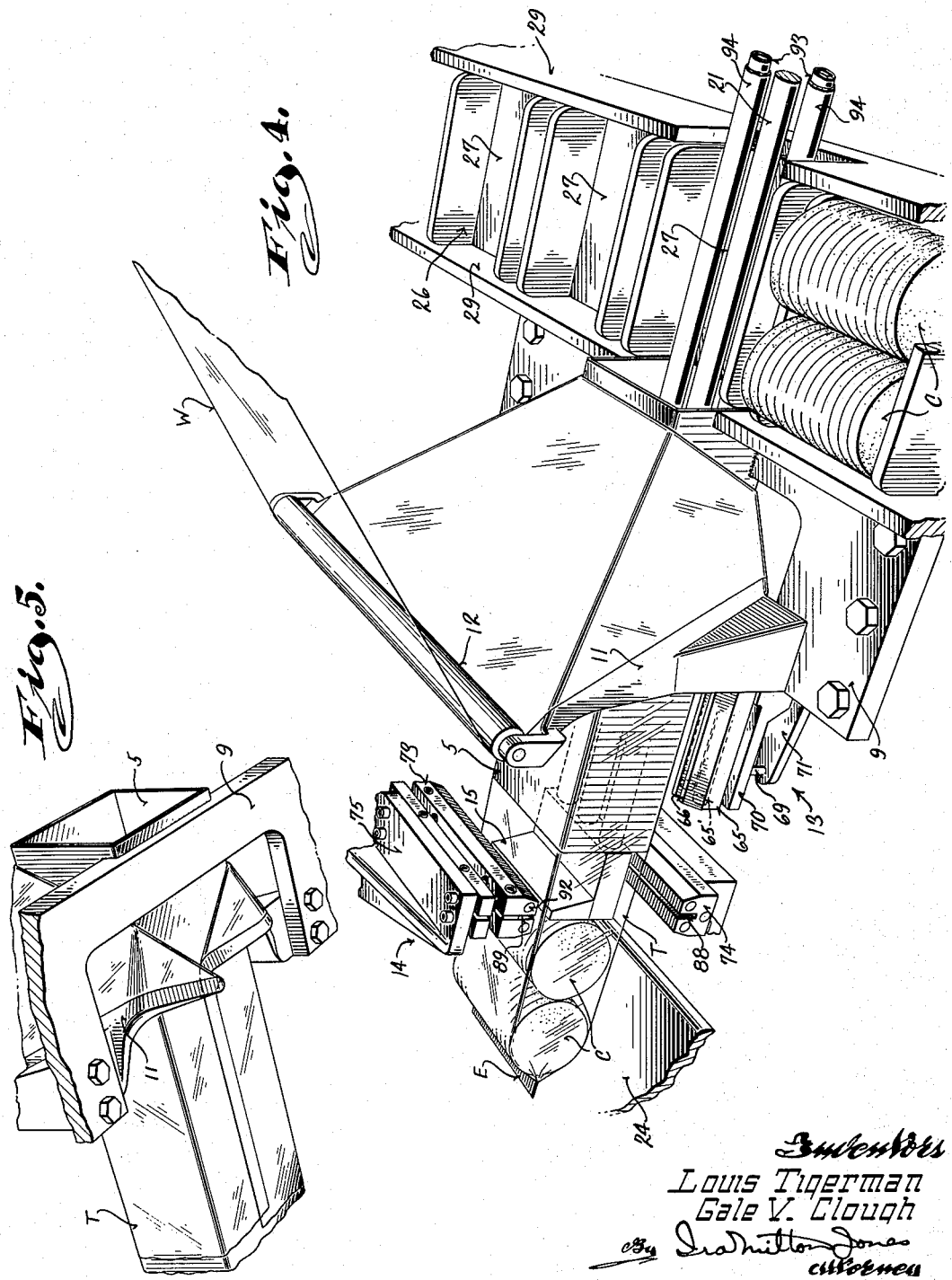

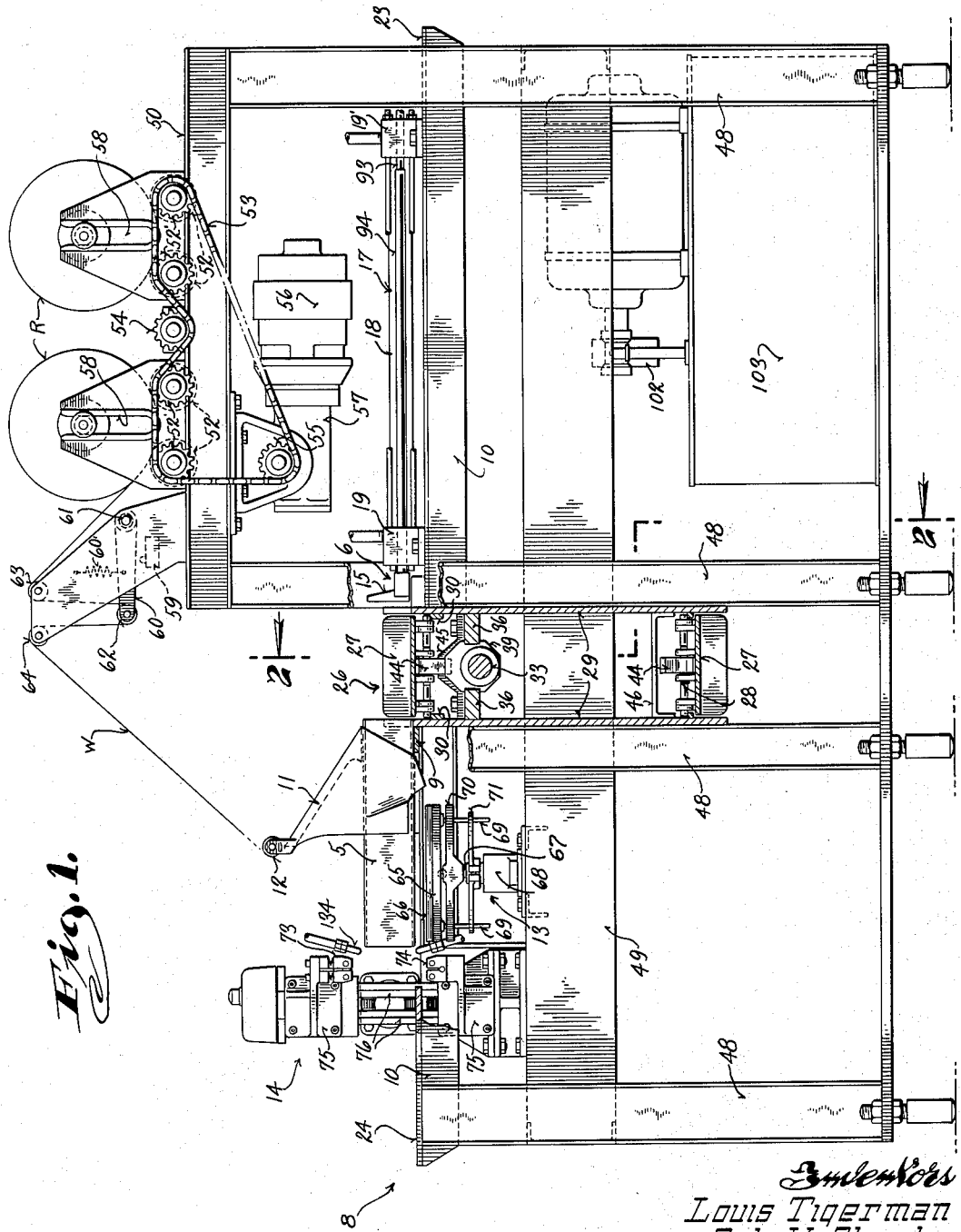

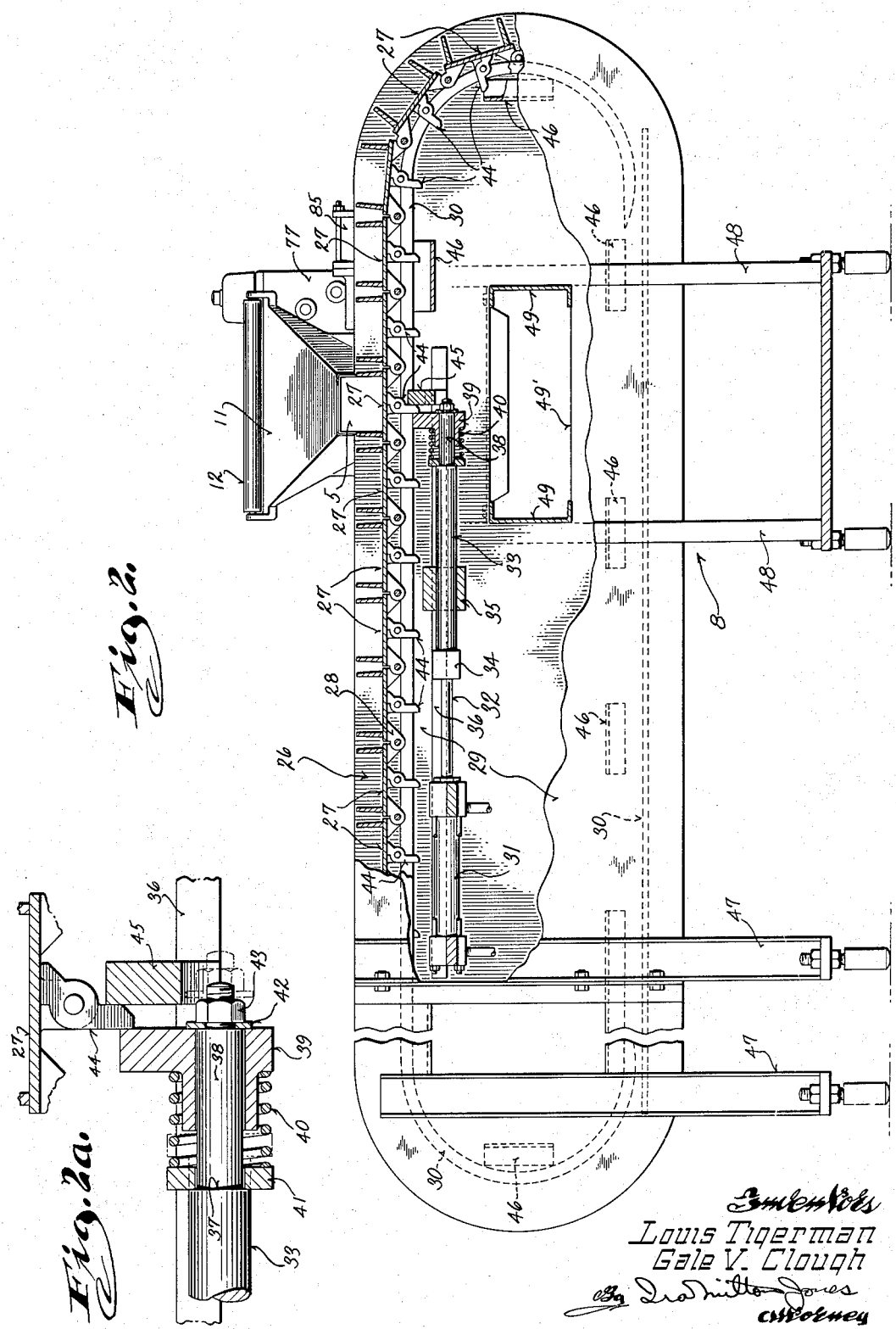

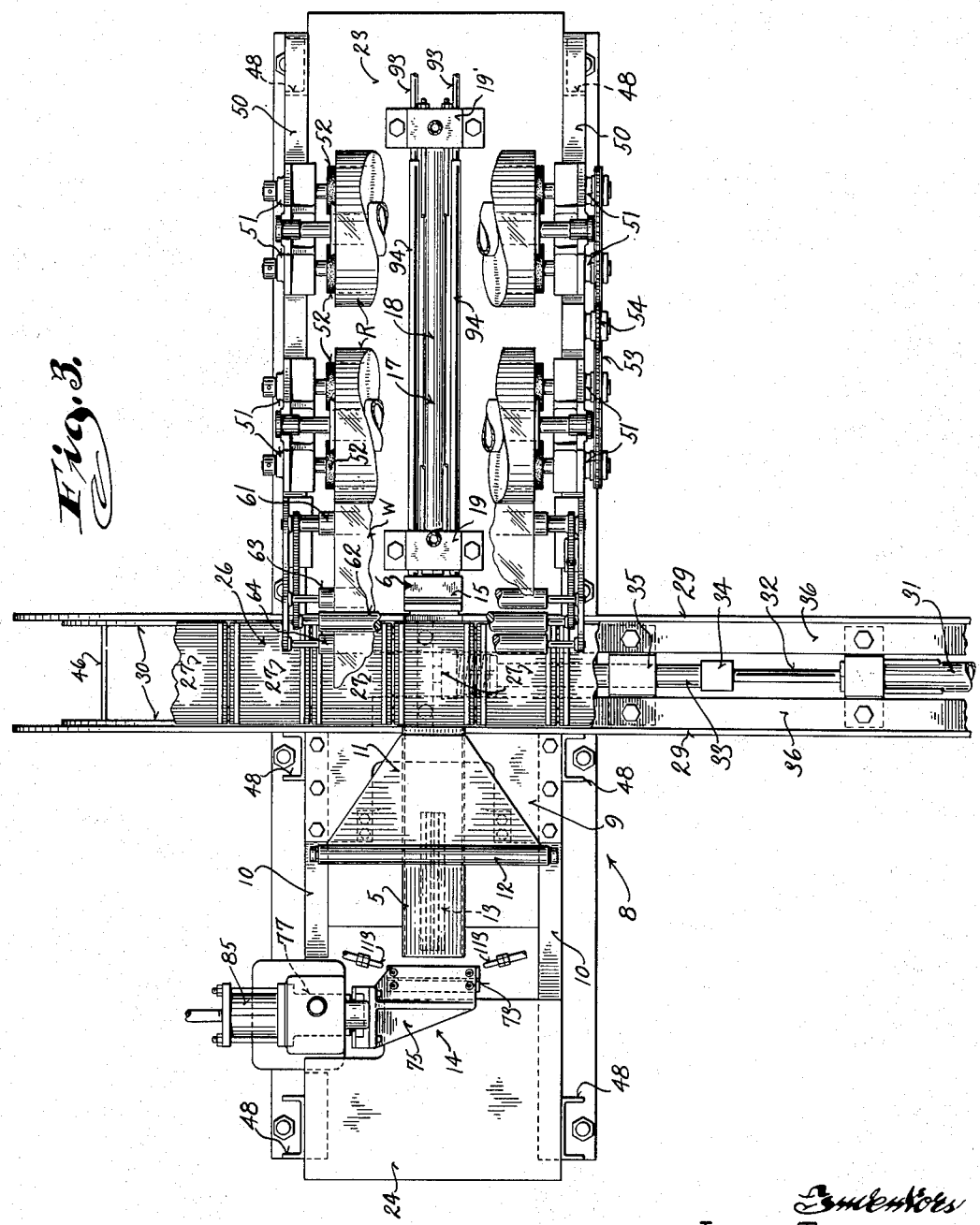

May 29, 1956 L. TIGERMAN ET AL 2,747,346
METHOD OF FORMING PACKAGES
Filed March 13, 1951 9 Sheets-Sheet 5
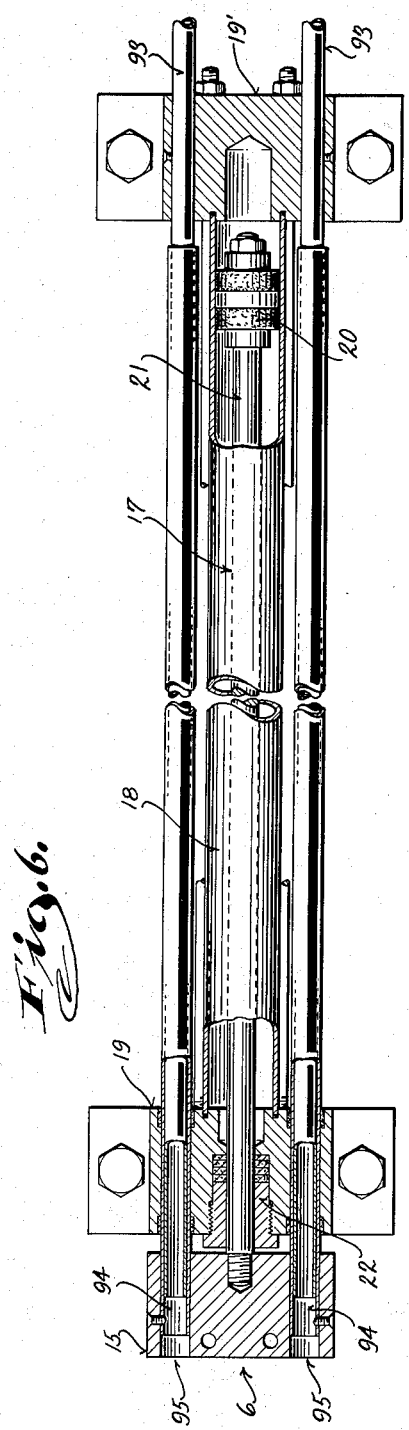
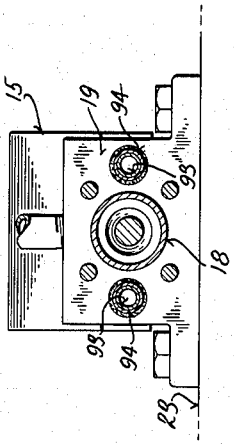
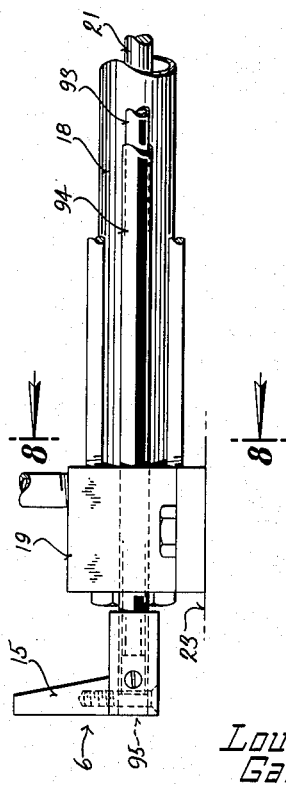
Inventors
Louis Tigerman
Gale V. Clough
Attorney May 29, 1956  L. TIGERMAN ET AL  2,747,346
METHOD OF FORMING PACKAGES
Filed March 13, 1951  9 Sheets-Sheet 6

Inventors
Louis Tigerman
Gale V. Clough
By Ira Milton Jones
Attorney

May 29, 1956   L. TIGERMAN ET AL   2,747,346
METHOD OF FORMING PACKAGES
Filed March 13, 1951   9 Sheets-Sheet 7
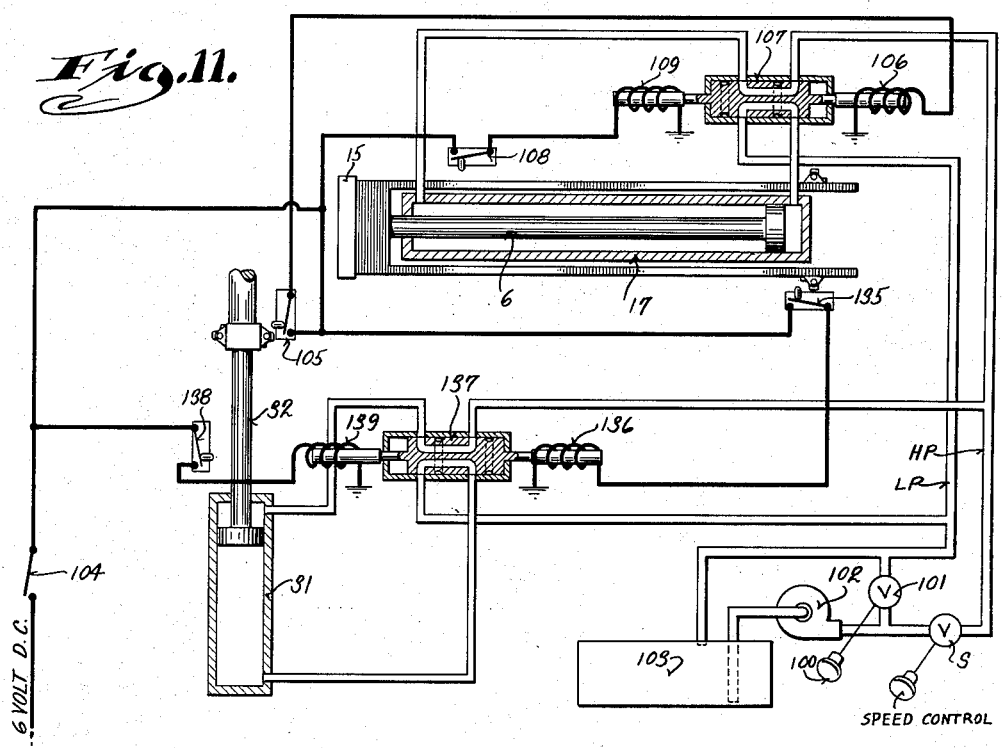
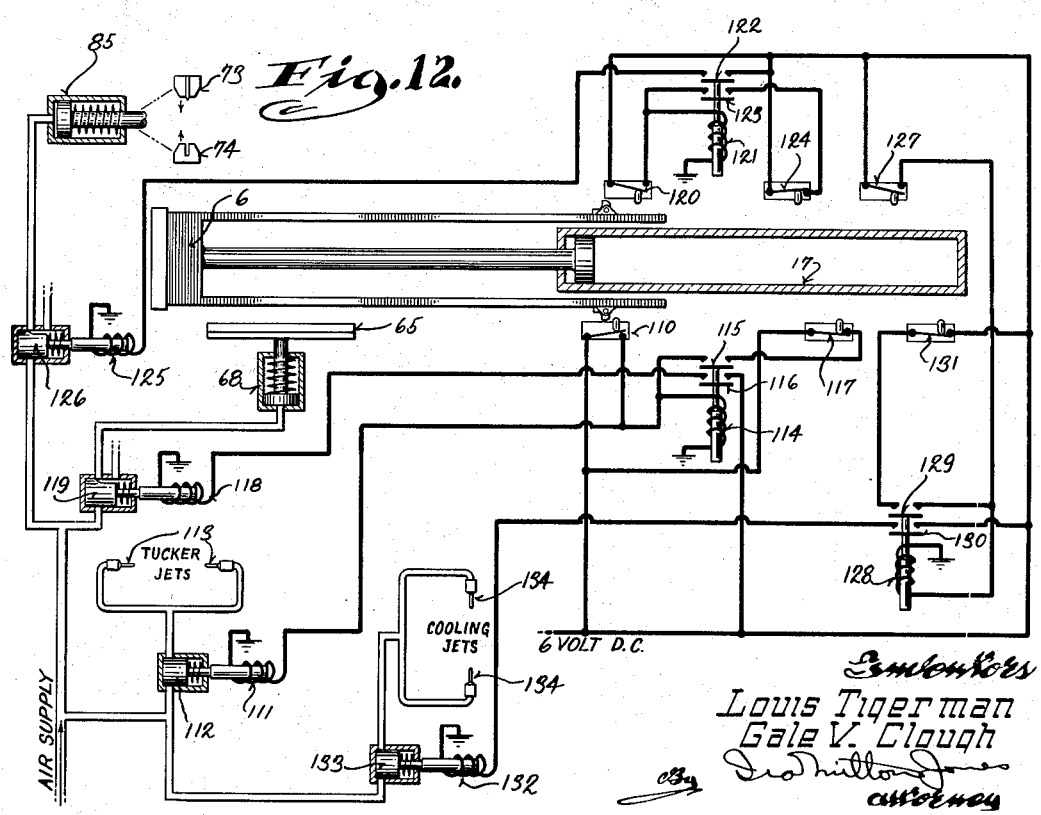
Inventors
Louis Tigerman
Gale V. Clough
By
Attorney

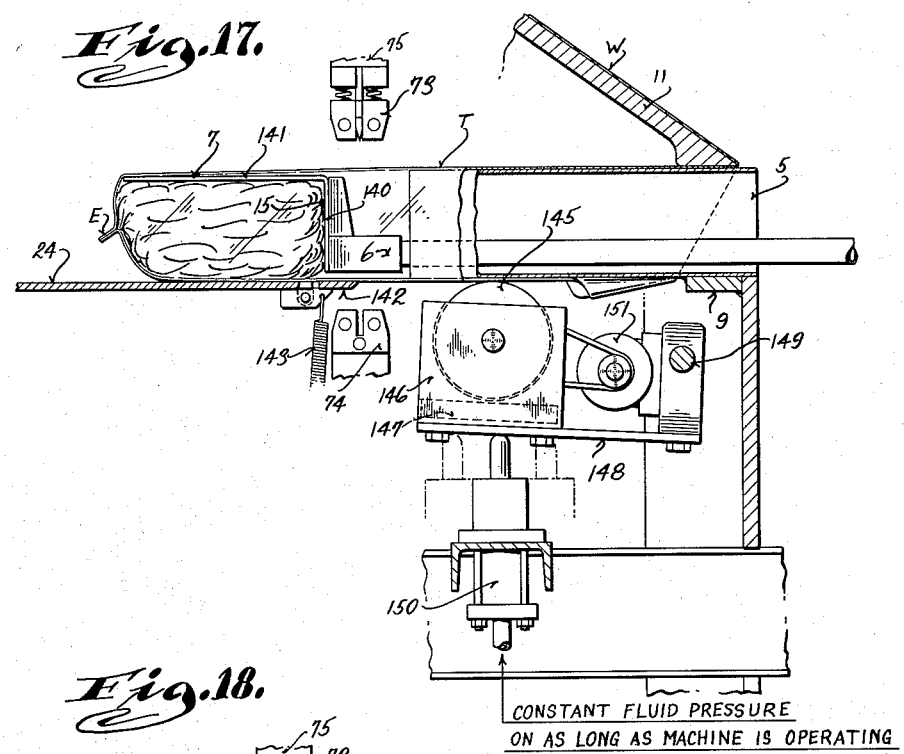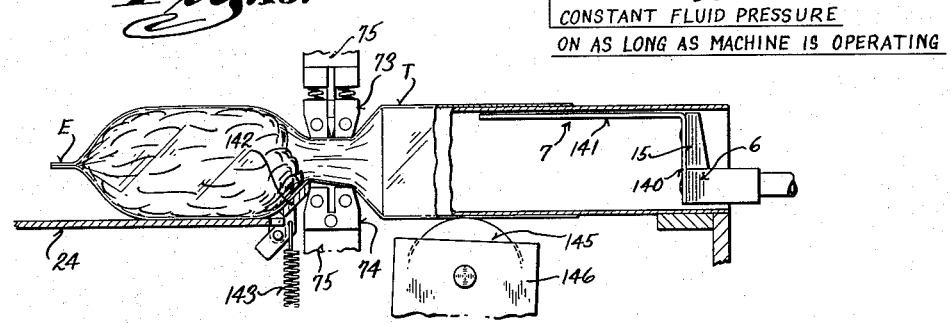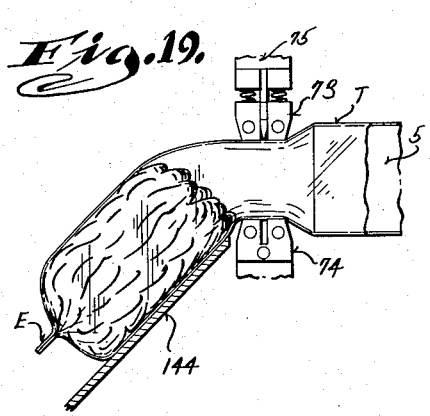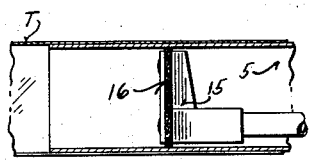

United States Patent Office 2,747,346
Patented May 29, 1956

2,747,346
METHOD OF FORMING PACKAGES

Louis Tigerman and Gale V. Clough, Milwaukee, Wis., assignors to Robert A. Johnston Company, Milwaukee County, Wis., a corporation of Wisconsin Application March 13, 1951, Serial No. 215,228

1 Claim. (Cl. 53—28)

This invention relates to a method of forming packages of the type in which a succession of bag-like containers or enwrapments is automatically produced from a web of sheet material and concomitantly with its formation each such enwrapment is filled with the product to be packaged.

Heretofore this packaging technique has been restricted to so-called flowable materials which can be fed by gravity. By contrast this invention has as its purpose to provide a packaging method by which non-flowable materials and products may be automatically packaged or more specifically enrobed in bag-like containers or enwrapments automatically made from a web of flexible sheet material such as paper or cellophane, without resorting to the so-called overwrapping method which is used to wrap such items as loaves of bread and which requires the products or articles to be wrapped to be of a specific size and shape or first placed in boxes of a given size and shape.

This invention, therefore, fills a need not satisfied by packaging methods and machines heretofore available which, as has been stated, are either limited to flowable material or to articles or products of a given size and shape which can be overwrapped; and in filling this need, makes it possible to enrobe or package with the same machine such widely dissimilar products as cookies, sandwiches, fruit including grapes, vegetables including spinach, meats, and even such fragile products as lemon pie and cream puffs. Moreover, these widely dissimilar products can be enrobed in any sequence without alteration or adjustment of the machine.

With the above and other objects in view, which will appear as the description proceeds, this invention resides in the unique method substantially as hereinafter described and more particularly defined by the appended claim, it being understood that such changes in the precise embodiment of the hereinafter disclosed invention may be made as come within the scope of the claim.

The accompanying drawings illustrate several examples of the physical embodiments of the invention constructed in accordance with the best modes so far devised for the practical application of the principles thereof, and in which:

Figure 1 is a view essentially in side elevation of a packaging machine or apparatus designed for the practice of this invention;

Figure 2 is a cross sectional view of the machine taken through Figure 1 on the plane of the line 2—2;

Figure 2A is an enlarged fragmentary detail view illustrating an important aspect of the manner in which the products to be packaged are brought into position for packaging;

Figure 3 is a top plan view of the entire apparatus with parts thereof broken away to better illustrate structural features thereof;

Figure 4 is a perspective view of that portion of the machine by which the products to be packaged are brought into packaging position and the manner in which the web is formed into the tube from which the bag-like enwrapments are made;

Figure 5 is a detail perspective view of the underside of the forming head by which the web is formed into a tube;

Figure 6 is a detail view essentially in top plan but with parts thereof broken away and in section illustrating the mechanism by which the products to be packaged are pushed into the bag-like enwrapments as they are produced;

Figure 7 is a side view of the forward portion of this mechanism;

Figure 8 is a cross sectional view through Figure 7 on the plane of the line 8—8;

Figure 11 is a schematic diagram of the hydraulic driving instrumentalities for the apparatus and the electrical control circuits therefor;

Figure 12 is a schematic diagram for the pneumatically actuated instrumentalities of the apparatus and the electrical control circuits therefor;

Figures 17 and 18 are essentially diagrammatic views similar to Figures 13 and 16 but showing a modified adaptation of the invention;

Figure 19 is a view similar to Figures 17 and 18 illustrating still another modified adaptation of the invention; and Figure 20 is a detail view of the plunger by which the product is pushed into the container, but illustrating the same adapted for use with loose finely divided or granulated material.

As suggested at the outset hereof, this invention involves the progressive formation of a tube from a web of sheet material which is preferably drawn off a roll, the intermittent advance of the tube, the transverse sealing of the tube with each advance thereof to divide the same into a succession of bag-like compartments and the filling of each compartment as it is formed, followed by severance of the filled compartments from one another. Broadly, this technique follows that phase of the prior art which dealt with the packaging of flowable materials, and of which the Zwoyer Patent No. 1,986,422 is an example.

To achieve its main purpose, which is to enable the packaging of non-flowable materials by this technique, this invention introduces some important distinctions over this past general method and these distinctions reside essentially in the manner in which the individual charges of the product being packaged are fed into the tube and the way in which the tube is advanced.

Figure 13:
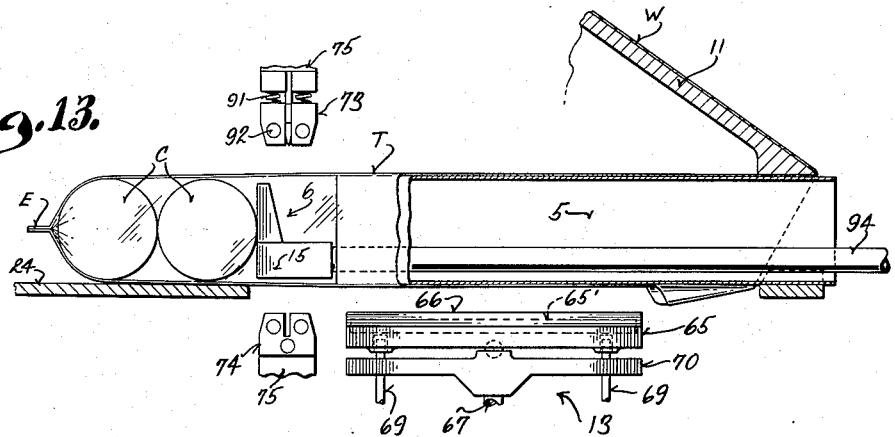
Figures 13, 14, 15 and 16 are more or less diagrammatic views progressively illustrating the essential steps in the packaging method of this invention.

Thus, the method of this invention involves the following steps. A web of sheet material is progressively formed into a tube; this tube is advanced longitudinally along a hollow mandrel having a feeding and delivery end until the tube projects beyond the delivery end of the mandrel; as the tube is formed the overlapping longitudinal edges of the web are secured together; the projecting portion of the tube is transversely collapsed and sealed to provide a closed end for the tube; a charge of the product to be packaged is then pushed into the closed end portion of the tube and by the same act a push is exerted upon the closed end of the tube from inside the tube to advance the same. Where the products being packaged are capable of withstanding the application of a compressive force thereon, the force needed to advance the tube is applied on its closed end directly through the product itself. Thus, as shown in Figure 13, which illustrates the packaging of such items as cookies, the tube T has been formed around a hollow mandrel 5. Its end E has been transversely sealed to close the same and the tube has been advanced by a push exerted upon its closed end through the charge of cookies C which have been fed through the hollow mandrel and pushed into the closed end portion of the tube by a plunger 6.

Figure 14:
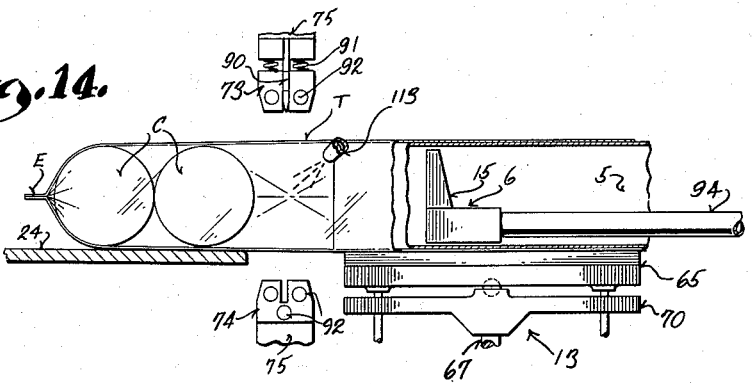
Figure 15:
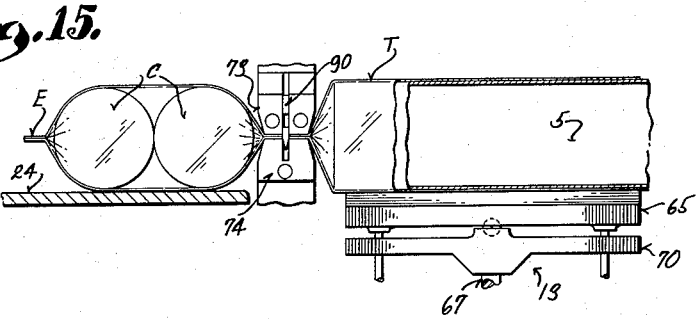

To complete the packaging, the portion of the tube directly in back of the charge of cookies is collapsed and sealed as illustrated in Figures 14 and 15, it being understood, of course, that before this takes place the plunger 6 is retracted. After the tube is transversely sealed to close the same in back of the charge, the sealed portion is cut off as shown in Figure 15 to thus sever the filled package from the rest of the tube which is left with its end closed and in readiness to receive the next charge.

It is important to observe that because the tube is advanced by the same act which pushes the product into its closed end portion, the amount the tube is advanced is always just sufficient to completely enrobe the product. In other words, the amount of the tube advance is automatically determined by the size of the charge and this is so regardless of what its shape or size might be.

Where the products to be packaged cannot withstand any compressive force thereon as, for instance, such items as cream puffs, or where the product is resilient as, for instance, bulk spinach, the advance of the tube, though still effected by the same act which feeds the product into the closed end of the bag, is accomplished by pushing on its closed end from inside the tube by means of a rigid member moved into the closed end portion of the tube along with the charge of the product being packaged but with its leading end in advance of the charge. This modification of the method is diagrammatically illustrated in Figures 17 and 18, the latter showing the plunger 6 in its advanced position and equipped with a rigid arm 7 protruding from the front face thereof to engage the closed end portion of the bag and draw the same forward as the product is pushed into the tube, the product in this case being illustrated as bulk spinach or the like.

It will be readily appreciated that while the method of this invention may be manually practiced, even in its modified form wherein the advance of the tube is effected by a rigid member inserted into the closed end portion of the tube along with and ahead of the product, in commercial practice it is, of course, desirable to employ an automatic machine or apparatus. One such machine or apparatus is illustrated in the accompanying drawings to which reference is now more specifically directed.

In its broad aspects the machine or apparatus comprises the hollow mandrel 5 about which the tube T is formed from a web W of suitable sheet material which may be a suitably coated paper, cellophane, Pliofilm or any other of the known types of wrapping materials capable of cohesion by heat and pressure. The hollow mandrel 5 is mounted horizontally upon a frame indicated generally by the numeral 8 and to which it is secured by a cross plate 9. This plate 9 is of U-shaped formation and has its ends resting upon side rails 10 which form part of the frame.

At its medial portion the plate 9 is notched out to receive the inlet end portion of the hollow mandrel 5 (as best shown in Figure 5) to which it is permanently secured by welding or the like. Though the cross-sectional shape of the hollow mandrel is determined somewhat by the nature of the products to be handled, in most instances it can be rectangular as shown.

A forming head 11 straddles the hollow mandrel at its inlet end and is supported in proper positional relationship with respect thereto by being secured to the cross plate 9, the securing bolts passing through the plate from the bottom and being threaded into holes opening to the underside of the head 11, as shown in Figure 5. The web of sheet material W is trained over an idler roll 12 at the upper end of the forming head and the forming head is so shaped that it imparts the desired tubular formation to the web and in effect wraps the web around the hollow mandrel.

The manner in which the forming head accomplishes this function is, of course, well known to the art and need not be described in detail. It is sufficient to note that the sides or marginal edges of the web, upon formation of the tube T, overlap at the underside of the mandrel so that they may be progressively adhered together by means of a longitudinal sealer indicated generally by the numeral 13.

Formed in this manner, the tube T can be drawn longitudinally along the hollow mandrel to project beyond its delivery end and into a transverse sealing zone in which a sealing mechanism indicated generally by the numeral 14 operates to collapse the projecting portion of the tube and transversely seal the same. This gives the tube a closed end so that an endwise force can be exerted thereon from inside the tube to advance the same along the hollow mandrel and draw the web over the forming head. As already brought out this endwise force may be applied by the forward stroke of the plunger 6 acting through the product or article in front of it or through the rigid arm 7.

The plunger is constrained to reciprocate within the hollow mandrel and preferably has a head 15 corresponding in shape to the cross-sectional shape of the hollow mandrel. For products such as loose granular material and which might have a tendency to cling to the sides of the hollow mandrel, the plunger may be equipped with an encircling gasket 16 which has a close fitting sliding engagement with the inner walls of the hollow mandrel, as shown in Figure 20. However, for most products, the plunger operates relatively loosely within the hollow mandrel.

A hydraulic cylinder 17 is provided to reciprocate the plunger. The barrel 18 of this cylinder is mounted between two stationary heads 19 and 19' which are drawn against its ends by tie bolts alongside the barrel, and its piston 20 is connected to the plunger 6 by means of a rod 21. The rod 21 slidably projects through a bore in the head 19 which is equipped with the customary packing gland 22. The heads 19 and 19' are bolted to a plate 23 which is fixed to the side rails 10 of the frame and provides a table for the feeding end portion of the machine.

Another plate 24 fixed to the other ends of the side rails 10 provides a table at the delivery end of the machine to receive the finished packages and from which a delivery chute may extend to any desired discharge point.

The forward stroke of the plunger 6 longitudinally through the hollow mandrel 5 always terminates with the face of the plunger just beyond the sealing zone at the delivery end of the hollow mandrel. Hence, regardless of the size of the charge advanced by the plunger the entire charge is always carried just past the sealing zone. In this manner the size of the package is automatically conformed to the size of the charge enrobed therein.

On its retraction stroke the plunger always comes to rest in a position clear of the loading zone in front of the inlet end of the hollow mandrel, and in which a feeding conveyor indicated generally by the numeral 26 operates. The conveyor 26 is disposed transversely to the frame 8 and extends a substantial distance to one side thereof as shown in Figure 2, to provide a relatively long loading station at which operators load the individual trays or pockets 27 of the conveyor with the product to be packaged. Though the specific construction of the feeding conveyor 26 is, of course, susceptible to modification and somewhat dependent upon the nature of the product being packaged, it comprises essentially a pair of endless chains 28 connected by the trays 27 which are channel-shaped in cross-section and in coaction with stationary side plates 29 between which the conveyor operates, provide open topped compartments.

The chains 28 have the customary rollers which ride upon tracks 30 mounted upon the inner faces of the plates 29 and the conveyor is periodically indexed to successively bring its trays 27 into alignment with the mouth of the hollow mandrel. At this point the side plates 29 are cut away to provide gateways through which the plunger 6 may be passed across the chain to push the contents of the tray then in position to be emptied, into the mouth of the hollow mandrel.

The means for periodically indexing the feeding conveyor comprises a hydraulic cylinder 31 mounted between the side plates 29. The ram 32 of this cylinder has its outer end connected by means of a coupling 34 to a shaft 33 axially slidable in a fixed bearing 35. The bearing 35 is mounted between the plates 29 by being secured to longitudinal opposed track forming rails 36 fixed to the plates 29.

At its outer end the shaft 33 is reduced in diameter to provide a shoulder 37 and a reduced end portion 38 upon which a pusher head 39 is slidably mounted. A compression spring 40 interposed between the pusher head 39 and a washer 41 bearing against the shoulder 37 yieldingly urges the pusher head 39 outwardly and against a stop washer 42 secured to the end of the shaft by a nut 43. The pusher head 39 is held against turning about the shaft by slidable engagement with the track forming rails 36 as clearly shown in Figure 1. This sliding engagement between the pusher head 39 and the rails 36 also coacts with the bearing 35 to constrain the shaft 33 to axial motion.

The pusher head 39 is engageable with dogs 44 one of which is pivotally mounted upon the underside of each tray 27 of the feeding conveyor to depend therefrom in the top feeding stretch of the conveyor. The pivotal connection of these dogs with their respective trays is such that they are restrained against counterclockwise rotation from a truly vertical position as viewed in Figure 2 so that as the pusher head 39 comes to bear thereagainst the entire conveyor is advanced. The extent of the advance is positively determined by a fixed stop 45 bolted to the track forming rails 36 at a point to properly locate the tray whose dog has been engaged by the pusher head in exact alignment with the hollow mandrel.

It is important, for the sake of accuracy, that the dog engaged during the advance of the conveyor is the one depending from the tray to be brought into this position of alignment. This assures against such misalignment as might result from the cumulative error of wear on the links of the chain if the indexing force is applied to the conveyor at some other point as for instance by a driven sprocket wheel which pulls the chain forward.

It is, of course, also important that the indexed tray be maintained in its proper indexed position regardless of pressure drop in the hydraulic cylinder 31 caused by subsequently acting devices being connected with the pressure source. To this end the thrust of the ram 32 is applied to the pusher head 39 through the spring 40. This allows the ram to continue its forward indexing stroke a substantial distance after the actuated dog has been brought up against the fixed stop 45. Thus, even though there may be a drop in pressure in the cylinder 31, the feeding conveyor will not slip back under the influence of its weight or some other extraneous force acting thereon. On the contrary, the reduction in pressure in the cylinder 31 merely releases the force stored in the spring 40 which is ample to hold the indexed dog firmly against the fixed stop 45.

The overtravel of the ram 32, as will be hereinafter more fully developed, also has the very important advantage of enabling the use of inexpensive micro switches to open and close the electric circuits which are controlled by the indexing motion of the ram.

The plates 29 between and by which the feeding conveyor is supported are held in properly spaced relation by a series of cross members 46 and are supported on legs 47 and by the legs 48 of the main frame 8. The legs 48 of the main frame support the longitudinal side rails 10 which are interrupted to accommodate the conveyor 26 and support the plates 23 and 24. A pair of opposed longitudinal channel members 49 also connect the legs and extend for the full length of the frame, passing through openings 49' in the side plates 29.

The legs 48 adjacent to the feed end of the machine are extended above the table 23 to support an upper carrying frame which includes horizontal side rails 50. Bearings 51 mounted on these side rails have rollers 52 journalled therein. These rollers which extend across the full width of the machine are arranged in pairs and each pair is adapted to have one roll R seated thereon. While a single roll may be all that is needed at one time, it is preferable to provide for at least two such rolls so that if desired a double thickness of wrapping material may be employed. The rollers 52 not only provide such duplicate roll supports, but, what is more important, they provide means for positively unwinding the rolls to relieve the web and the tube formed therefrom of the force needed to unwind them and in addition do so in a manner assuring identical peripheral speed for both even though the diameters of the rolls may differ.

Thus the shafts of the rollers 52 project at one end and have sprockets 52' fixed thereon, and all of these sprockets are connected by a chain 53 which passes over the tops thereof and under an idler sprocket 54 between the two pairs of rollers. The chain 53 is also trained about a drive sprocket 55 driven from an electric motor 56 through a suitable gear reduction 57. The direction of the motor rotation is such that when it operates it rotates all of the rollers 52 in the counterclockwise direction as viewed in Figure 1 to thereby unwind the rolls R at the same peripheral speed, regardless of the respective diameters of the two rolls.

To assure the rolls remaining seated upon their respective rollers, the spindle ends of the rolls ride in vertical slots 58 in brackets which extend up from the frame members 50.

The motor 56 is controlled by a micro switch 59 positioned to be actuated by a lever 60 pivoted as at 61 and carrying an idler roll 62 at its outer free end. The web coming from the two rolls, or one of them if only one is being used, passes over an idler 63, under the idler roll 62, and over another fixed idler roll 64 and then on down to the idler roll 12 at the top of the forming head. Thus, it will be seen that the tension of the web determines whether or not the lever 60 rests upon the actuator of the micro switch 59, and since the micro switch 59 is closed whenever the lever 60 is lifted off its actuator the motor 56 will operate whenever the tension on the web W exceeds a predetermined value determined by the downward bias upon the arm 60, the weight of which is levitated by a suitable counterbalancing spring 60'.

As will be readily apparent one of the rolls, instead of providing a second thickness of enwrapment may provide an identifying ribbon or the like to be embodied in the package at the inside thereof.

The longitudinal sealer 13 is mounted upon the longitudinal rails 49 of the main frame under the hollow mandrel 5. In its embodiment illustrated in Figures 1 to 16, inclusive, it comprises a shoe 65 heated by a suitable heating element 65', and having a longitudinal edge 66 adapted to be brought to bear against the overlapping marginal edges of the web forming the tube to thereby heat seal the same together.

The shoe 65 is rockably supported on the outer end of a ram 67 of an air cylinder 68. Guide pins 69 depending from the shoe and slidably received in a cross arm 70 fixed to the ram 67 and in another cross arm 71 fixed to the cylinder 68 guide the shoe for movement and hold it longitudinally aligned with the overlapping marginal edges of the web while at the same time permitting the same to float and adjust itself as required.

Obviously, the sealing shoe 65 is operative only when pressure is manifested in the cylinder 68 to lift the shoe, and as will be hereinafter described this pressure is on only when the tube T is not being advanced and, of course, only if the machine is operating.

Figure 9:
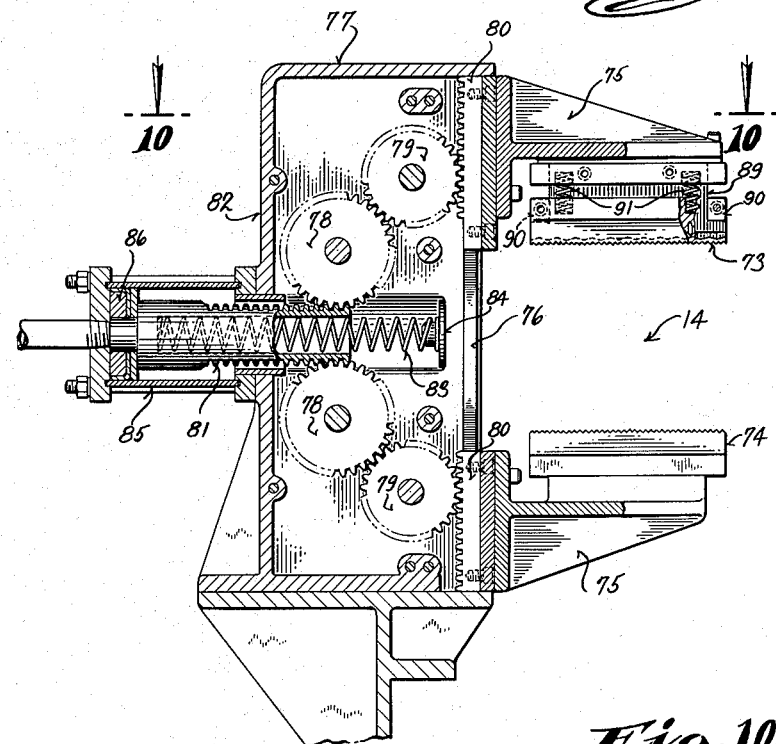
Figure 9 is a detail view in vertical section of the jaw mechanism by which the tube is collapsed and transversely sealed to produce the individual packages.
Figure 9A:
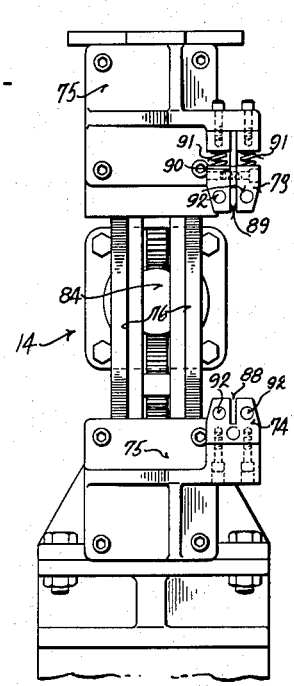
Figure 9A is a front view of the jaw mechanism shown in Figure 9.
Figure 10:
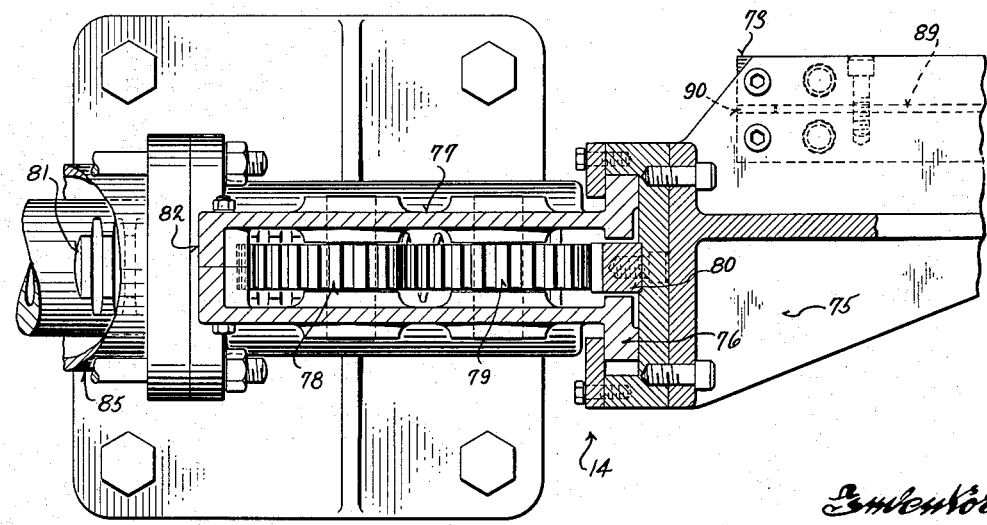
Figure 10 is a horizontal sectional view through Figure 9 on the plane of the line 10—10.

The transverse sealing mechanism indicated generally by the numeral 14 is also mounted upon the longitudinal rails 49 of the main frame and as best shown in Figures 9–10 comprises an upper jaw 73 and a lower jaw 74 each carried by a bracket 75 which is slidably mounted upon a vertical guide 76. The guide 76 provides the front wall of a gear box 77 containing two pairs of driving and driven gears 78 and 79 respectively, one for the upper jaw and the other for the lower jaw. The driven gears 79 in each instance mesh with a rack 80, each of which is secured to one of the brackets 75 and the driving gears 78 are both meshed with a double rack 81 constrained to reciprocate upon a horizontal axis extending medially between the two pairs of gears and through the back wall 82 of the gear box.

Thus, as the double rack 81 which is preferably a hollow cylindrical shaft with the two sets of rack teeth cut at diametrically opposite sides thereof is reciprocated both sets of gears 78—79 are driven to open and close the jaws 73—74. A spring 83 reacting between a fixed spring seat 84 at the front of the gear box and the rack yieldingly urges the rack outwardly, i. e. rearwardly of the gear box to open the jaws. Closure of the jaws is effected by an air cylinder 85 mounted upon the back of the gear box in line with the rack, the piston 86 of the cylinder being secured directly to the rack.

The lower jaw 74 is one solid member solidly bolted to its bracket 75, but it has a slit 88 down the center to receive the cutting knife 89 which moves with the upper jaw and severs the filled packages from the tube after the jaws have come together and effected their sealing function. The knife 89 is solidly fixed to the bracket 75 which carries the upper jaw and when the jaws are separated is ensheathed within the upper jaw. To this end the upper jaw consists of two complementary halves bolted together at their ends with the knife, which has an inverted T shape, slidably received therebetween, the bolts which hold the halves together passing through spacers 90. These spacers rest upon the projecting ends of the T-shaped knife blade to support the jaw 73 and take the reaction of compression springs 91 by which the jaw is urged downward. As will be readily apparent, during closure of the jaws these springs provide the clamping pressure to effect the seal and in yielding allow the knife to enter the slit 88 and sever the sealed tube.

It is, of course, to be understood that both jaws have suitable heating elements 92 embedded therein.

If desired, provision may be made for exhausting air from the bag-like enwrapments as they are made and filled. This is conveniently accomplished by two pairs of telescoping tubes 93 and 94, the former—which are the inner tubes—passing through and being fixed to the head 19' and the latter—which are the outer tubes—being fixed to and opening to ports 95 in the head 15 of the plunger so as to move therewith. One of the stationary tubes 93 may be connected with a source of suction and the other with a source of inert gas under pressure through suitable control valves (not shown), it being understood that these valves would have to be opened and closed in synchronism with the reciprocation of the plunger.

The telescoping tubes 93—94 in addition to providing for the exhaustion of air and introduction of inert gas into the bag-like enwrapments also serve to hold the plunger against rotating about the axis of its hydraulic cylinder and thus obviate the need for stationary guide rods which otherwise would be necessary.

*Operation*

In the operation of the machine or apparatus the operator first closes all the necessary thermostat switches so that the heaters in the sealing elements come up to the required temperature. The master control knob 100 (see Figure 11) is then moved to its "off" position. This opens a bypass valve 101 in the hydraulic system to bypass the discharge from the pressure pump 102 for the hydraulic system back into its reservoir 103. These elements are conveniently mounted in the bottom of the frame as shown in Figure 1.

With the master control knob in its "off" position the power switches controlling the current to the roll unwinding motor 56 and the motor of the pump 102 are closed, as is also the main switch 104 of the low voltage control circuit. The master control knob is then moved to its "on" position and the machine starts cycling automatically from whatever position it was left. For a logical beginning, assume that the indexing of the feeding conveyor is just about to take place. The conveyor indexing cylinder 31 thus indexes the conveyor to bring its tray 27 which is to be emptied in front of the mouth of the hollow mandrel 5. During this indexing stroke of the indexing cylinder a micro switch 105 is momentarily closed to supply current to a solenoid 106 to energize the same and shift the control valve 107 of the plunger driving cylinder 17 (Figure 11) to its position connecting the right hand end of the cylinder with the supply or high pressure line HP and its left hand with the exhaust or low pressure line P.

It is important to observe that the micro switch 105 is not closed until the tray being indexed has been brought to its proper position and that because of the overtravel of the ram 32 permitted by its yielding connection with the pusher head 39, as hereinbefore described, the setting of the micro switch 105 with respect to the stroke of the ram 32 is not at all critical.

Thus, after the tray has been indexed to its proper position the cylinder 17 advances the plunger 6 to push the product or article off the indexed tray and through the hollow mandrel into the closed end of the tube T. As the product or article thus advanced comes in contact with the closed end of the tube it pulls the tube forward and draws the web through the forming head and around the hollow mandrel. The resulting tension on the web lifts the switch controlling lever 60 which starts the motor 56 to unroll the web from the rolls R. The web is, therefore, relatively slack so that no serious load is placed upon the product or article being bagged or on the sealed end of the tube.

At the completion of the loading stroke of the plunger 6 the entire product or article being bagged will have been advanced through and just past the transverse sealing zone as shown in Figure 13, and as soon as the advance of the plunger stops the lever 60 drops to its normal position and thus stops the roll unwinding motor 56.

As the plunger 6 completes its advance or loading stroke a micro switch 108 is momentarily closed to energize a solenoid 109 and shift the valve 107 to its position shown in Figure 11. This connects the left hand end of the cylinder 17 with the supply or high pressure line HP and the right hand end of the cylinder with the exhaust or low pressure line LP, and as a result the plunger 6 begins its retraction stroke.

Just as soon as the plunger has begun its retraction stroke it momentarily closes a micro switch 110 to energize a solenoid 111 (Figure 12). With the energization of the solenoid 111 a control valve 112 is opened and air under pressure flows to a pair of tucker jets 113. These tucker jets are positioned to direct their air blasts against the sides of the tube in the transverse sealing zone and thereby assure that these sides will be folded in during the operation of the transverse sealing jaws 73—74. While these tucker jets could be dispensed with they assure a better appearing seal by preventing the sides of the tube being squashed out.

The momentary closure of the switch 110 also energizes a solenoid 114 which closes two switches 115 and 116. The switch 115 establishes a holding circuit for the solenoid 114 through a normally closed micro switch 117 and also maintains the solenoid 111 energized so that the tucker jets continue to operate notwithstanding reopening of the switch 110. Closure of the switch 116 energizes a solenoid 118 to shift the position of a spring loaded control valve 119 and thereby supply air under pressure to the cylinder 68. Air pressure manifested in the cylinder 68 lifts the longitudinal sealing shoe 65 against the underside of the hollow mandrel to seal the overlapping longitudinal edges of the tube as shown in Figure 14.

Substantially concomitantly with the closure of the micro switch 110 the retraction of the plunger 6 also effects momentary closure of a micro switch 120 to energize a solenoid 121. Energization of the solenoid 121 closes two switches 122 and 123, the closure of the latter establishing a holding circuit for the solenoid 121 through a normally closed micro switch 124. Closure of the switch 122 effects energization of a solenoid 125 which shifts the position of a spring loaded control valve 126 to thereby supply air under pressure to the cylinder 85 and effect closure of the sealing jaws 73—74 and severance of the completed enwrapment or package from the tube as shown in Figure 15.

The sealing jaws 73—74 remain closed until the plunger retracts far enough to momentarily open the switch 124 which allows the solenoid 121 to de-energize and open the switches 122 and 123. The longitudinal sealer 65 remains up and the tucker jets 113 remain operative until the plunger retracts to a position at which it momentarily opens the micro switch 117 whereupon the solenoid 114 drops out to open its switches 115 and 116.

Figure 16:
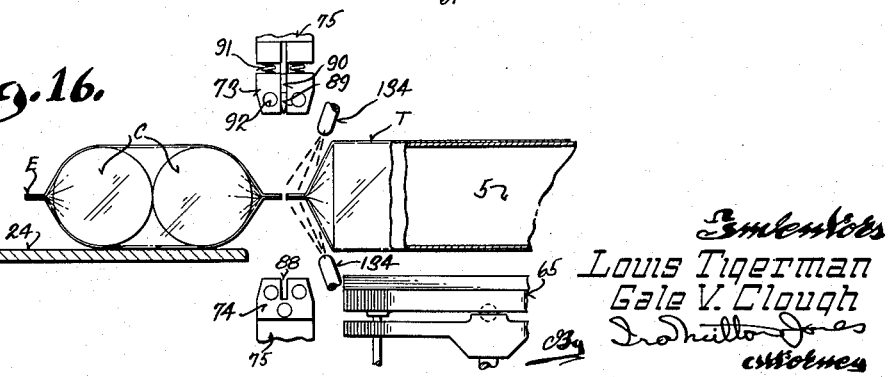

Directly thereafter and with a slightly further retraction of the plunger, a normally open micro switch 127 is momentarily closed to energize a solenoid 128. Energization of this solenoid closes switches 129 and 130 the former closing a holding circuit for the solenoid 128 through a normally closed micro switch 131. The switch 130 upon closure effects energization of a solenoid 132 which actuates a spring loaded air valve 133 to supply air under pressure to cooling jets 134 positioned to direct cooling air blasts onto the sealed and severed end portions of the tube and package as shown in Figure 16; and shortly thereafter the further retraction of the plunger momentarily opens the switch 131 to de-energize the solenoid 128 and allow its switches 129 and 130 to reopen. With the opening of the latter the cooling jets are turned off.

Just before the plunger completes its retraction it momentarily closes a switch 135 (Figure 11) to effect energization of a solenoid 136. Energization of the solenoid 136 shifts the control valve 137 of the indexing cylinder 31 to its position shown in Figure 11 to connect the upper end of this cylinder (as viewed in Figure 11) with the supply or high pressure line HP and the lower end of the cylinder with the exhaust or low pressure line LP. As a result the cylinder 31 begins to retract its indexing ram 32. This is the position of the parts shown in Figure 11.

Retraction of the ram 32 does not affect the switch 105 so that it remains open, but near the end of its retraction a micro switch 138 is momentarily closed. The closure of this switch effects energization of a solenoid 139 to shift the valve 137 to the left as viewed in Figure 11 and thereby reverse the hydraulic connections to the cylinder 31 and thereby effect reversal of its ram 32 which thus indexes the next tray 27 to unloading position in front of the mouth of the hollow mandrel.

This cycle repeats itself as long as the master control button 100 is in its "on" position closing the bypass valve 101. The speed at which the cycle operates is readily adjustable by a control valve S which may be connected in the supply or exhaust line but is preferably placed in the former.

Modifications of Figures 17, 18 and 19

The modified embodiment of the invention illustrated in Figures 17 and 18 is adapted to handle material incapable of transmitting the necessary push upon the closed end of the tube, and such resilient material as bulk spinach. For this purpose, as already indicated, the face 15 of the plunger has a forwardly projecting rigid arm 7 attached thereto. This arm is preferably in the form of a right angular member having an attaching flange 140 adapted to be secured to the face 15 of the plunger and a flat horizontal wall 141. This wall serves as a cover for the material being packaged and holds the same down as it is pushed out of the indexed tray and into the mouth of the hollow mandrel.

To prevent resilient or loose material following the plunger as it is retracted and thus interfere with proper transverse sealing, the table or platform 24 may have a gate 142 hinged thereto and projecting into the path of the lower clamping jaw 74 in which position it is yieldingly maintained by a spring 143. As shown in Figure 18, when the clamping jaws come together this hinged gate is lifted against the underside of the tube and thereby pushes the contents of the closed end portion of the tube forwardly.

If desired, the arrangement shown in Figure 19 may be employed in lieu of the hinged gate 142. In this case the table 24 is supplanted by a downwardly inclined chute 144 so that as the filled end portion of the tube moves through the transverse sealing zone it drops down and gravity holds its contents in position.

The structure illustrated in Figures 17 and 18 differs from that described also in the manner in which the longitudinal seal is effected. As shown, the sealing shoe 65 is replaced by a rotary sealing wheel 145 which rides upon the overlapping marginal edge portions of the web, and, being heated, supplies the heat and pressure required to effect the seal.

The wheel 145 is mounted in a housing 146 which is heated by an electric heating element 147, and is mounted upon an arm 148 pivoted to the frame as at 149. A hydraulic cylinder 150 maintains a constant fluid pressure upon the underside of the arm to hold the wheel against the bottom of the hollow mandrel as long as the machine is operating and the fluid pressure is available. Since the fluid pressure is constant, adjustment of the contact pressure is obtained by shifting the position of the cylinder 150 lengthwise of the arm 148.

An important feature of this sealer is that the wheel 145 is driven by a stall-torque air motor 151, the torque of which is sufficient to impart rotation to the wheel 145 whenever the tube is being advanced but insufficient to drive the same when the tube is not moving along the mandrel. Hence, the tube wall is not marred by relative motion between it and the sealer.

As compared to the pressure shoe 65 this rotary sealer has the advantage of enabling reduction in the length of the hollow mandrel and consequently the entire machine and in addition affords assurance against having the overlapping marginal edge portions of the web plowed apart.

From the foregoing description taken in connection with the accompanying drawings and the appended claim it will be readily apparent to those skilled in the art that this invention provides an important advance in the packaging art particularly since it enables the packaging of a wide variety of non-flowable materials regardless of size, shape and character and enables the same machine without alteration or adjustment to handle widely dissimilar products and goods in any sequence.

What we claim as our invention is:

A method of packaging, which comprises: progressively forming one end portion of a web of pliable packaging material in sheet form into tubing of a length sufficient to receive a charge of material to be packaged; transversely sealing the tubing at a point remote from said web to provide a first closed end for the tubing; with the tubing stationary and its closed end unsupported from the exterior, pushing a charge of material into the closed end portion of the tubing and at the same time projecting a rigid member longitudinally into the tubing and against the closed end thereof to thereby advance the charged tubing endwise, solely by the application of force to the closed end thereof from inside the tubing, a distance at least equal to the length of said charge longitudinally of the tubing; utilizing such advancing motion of the charged tubing to progressively form the web of packaging material into another length of tubing continuous with the first and in which the next charge of material may be packaged; withdrawing said rigid member from the charged tubing; and transversely sealing the tubing in back of said charge of material therein to close the tubing about said charge and to provide a first closed end on said other length of tubing.

References Cited in the file of this patent

UNITED STATES PATENTS

| | | |
|---|---|---|
| 1,143,801 | Bates | June 22, 1915 |
| 1,918,824 | Phillips et al. | July 18, 1933 |
| 1,927,585 | Fischer et al. | Sept. 19, 1933 |
| 1,996,719 | Denz | Apr. 2, 1935 |
| 2,080,834 | Petskeyes | May 18, 1937 |
| 2,092,144 | Sticelber | Sept. 7, 1937 |
| 2,094,402 | Grover | Sept. 28, 1937 |
| 2,113,656 | Vogt | Apr. 12, 1938 |
| 2,113,658 | Lasko | Apr. 12, 1938 |
| 2,145,941 | Maxfield | Feb. 7, 1939 |
| 2,160,367 | Maxfield | May 30, 1939 |
| 2,180,966 | Salfisberg | Nov. 21, 1939 |
| 2,194,451 | Soubier | Mar. 19, 1940 |
| 2,272,251 | Robinson | Feb. 10, 1942 |
| 2,284,223 | Morgan | May 15, 1942 |
| 2,345,355 | Neal | Mar. 18, 1944 |
| 2,384,494 | Schutter | Sept. 11, 1945 |
| 2,447,754 | Hirschhorn | Aug. 24, 1948 |
| 2,529,777 | McInnis | Nov. 14, 1950 |
| 2,555,758 | Noble et al. | June 5, 1951 |
| 2,613,488 | Attride | Oct. 14, 1952 |
| 2,641,095 | Burband | June 9, 1953 |